(12) United States Patent  
Tirumalachetty et al.

(10) Patent No.: US 8,868,406 B2  
(45) Date of Patent: Oct. 21, 2014

(54) SYSTEM AND METHOD FOR CLASSIFYING COMMUNICATIONS THAT HAVE LOW LEXICAL CONTENT AND/OR HIGH CONTEXTUAL CONTENT INTO GROUPS USING TOPICS

(75) Inventors: Vikranth Babu Tirumalachetty, Hyderabad (IN); Krishna Kishore Dhara, Dayton, NJ (US); Venkatesh Krishnaswamy, Holmdel, NJ (US); Eunsoo Shim, Princeton Junction, NJ (US); Xiaotao Wu, Edison, NJ (US)

(73) Assignee: Avaya Inc., Basking Ridge, NJ (US)

( * ) Notice: Subject to any disclaimer, the term of this patent is extended or adjusted under 35 U.S.C. 154(b) by 881 days.

(21) Appl. No.: 12/978,983

(22) Filed: Dec. 27, 2010

(65) Prior Publication Data

US 2012/0166179 A1 Jun. 28, 2012

(51) Int. Cl.
*G06F 17/27* (2006.01)
(52) U.S. Cl.
CPC .................. *G06F 17/2745* (2013.01)
USPC ............................................................ 704/9
(58) Field of Classification Search
CPC ....... G06F 17/27; G06F 17/28; G06F 17/277; G06F 17/2775; G06F 17/2785; G06F 17/30029
USPC ............................................................ 704/9
See application file for complete search history.

(56) References Cited

U.S. PATENT DOCUMENTS

| | | | | |
|---|---|---|---|---|
| 2003/0217052 | A1* | 11/2003 | Rubenczyk et al. | 707/3 |
| 2004/0024755 | A1* | 2/2004 | Rickard | 707/3 |
| 2004/0034633 | A1* | 2/2004 | Rickard | 707/5 |
| 2004/0068527 | A1* | 4/2004 | Smith, III | 707/204 |
| 2004/0128301 | A1* | 7/2004 | Thint et al. | 707/101 |
| 2005/0149494 | A1* | 7/2005 | Lindh et al. | 707/3 |
| 2006/0053171 | A1* | 3/2006 | Eldridge et al. | 707/203 |
| 2006/0053174 | A1* | 3/2006 | Gardner et al. | 707/203 |
| 2006/0053382 | A1* | 3/2006 | Gardner et al. | 715/764 |
| 2007/0156636 | A1* | 7/2007 | Norton et al. | 707/1 |
| 2007/0282785 | A1* | 12/2007 | Fayyad et al. | 707/1 |

OTHER PUBLICATIONS

U.S. Appl. No. 61/385,842, Dhara et al., filed Sep. 23, 2010.
T. L. Griffiths and M. Steyvers, "Finding scientific topics," *Proceedings of the National Academy of Sciences*, vol. 101, pp. 5228-5235, Apr. 2004.

(Continued)

*Primary Examiner* — Michael N Opsasnick

(57) ABSTRACT

Disclosed herein are systems, methods, and non-transitory computer-readable storage media for identifying document topics. A system configured to practice the method receives a document from a corpus of documents, learns interpersonal relationships of users associated with the document, performs a lexical analysis of the document, and, based on the interpersonal relationships of the users and the lexical analysis, identifying a topic for the document. The approaches disclosed herein can integrate user-people relationships to identify topics for documents with low lexical or high contextual content. The system can learn this user-people relationship from context. The system uses this learned behavior to identify communication documents correctly. Another aspect is the separation of the two phases. The system overlays the learned model on the lexical topic analysis, allowing the system to capture user-defined topics and user behavior that is learned from other factors such as medium (calls, events, etc) or user preferences.

12 Claims, 13 Drawing Sheets

(56) References Cited

OTHER PUBLICATIONS

A. McCallum, X. Wang, and A. Corrada-Emmanuel, "Topic and role discovery in social networks with experiments on enron and academic email," *Journal of Artificial Intelligence Research,* vol. 30, pp. 249-272, 2007.

J. Chang and D. Blei, "Relational topic models for document networks," in *AAISTATS '09: Proceedings of the Conference on AI and Statistics,* 2009.

X. Wei and W. B. Croft, "Lda-based document models for ad-hoc retrieval," in *SIGIR '06: Proceedings of the 29th annual international ACM SIGIR conference on Research and development in information retrieval,* (New York, NY, USA), pp. 178-185, ACM, 2006.

Y. Liu, A. Niculescu-Mizil, and W. Grye, "Topic-link LDA: joint models of topic and author community," in *ICML '09: Proceedings of the 26$^{th}$ Annual International Conference on Machine Learning,* (New York, NY, USA), pp. 665-672, ACM, 2009.

\* cited by examiner

χ(dhara, vbabut) and χ(dhara, venky)

χ(dhara, xwu) and χ(dhara, venky)

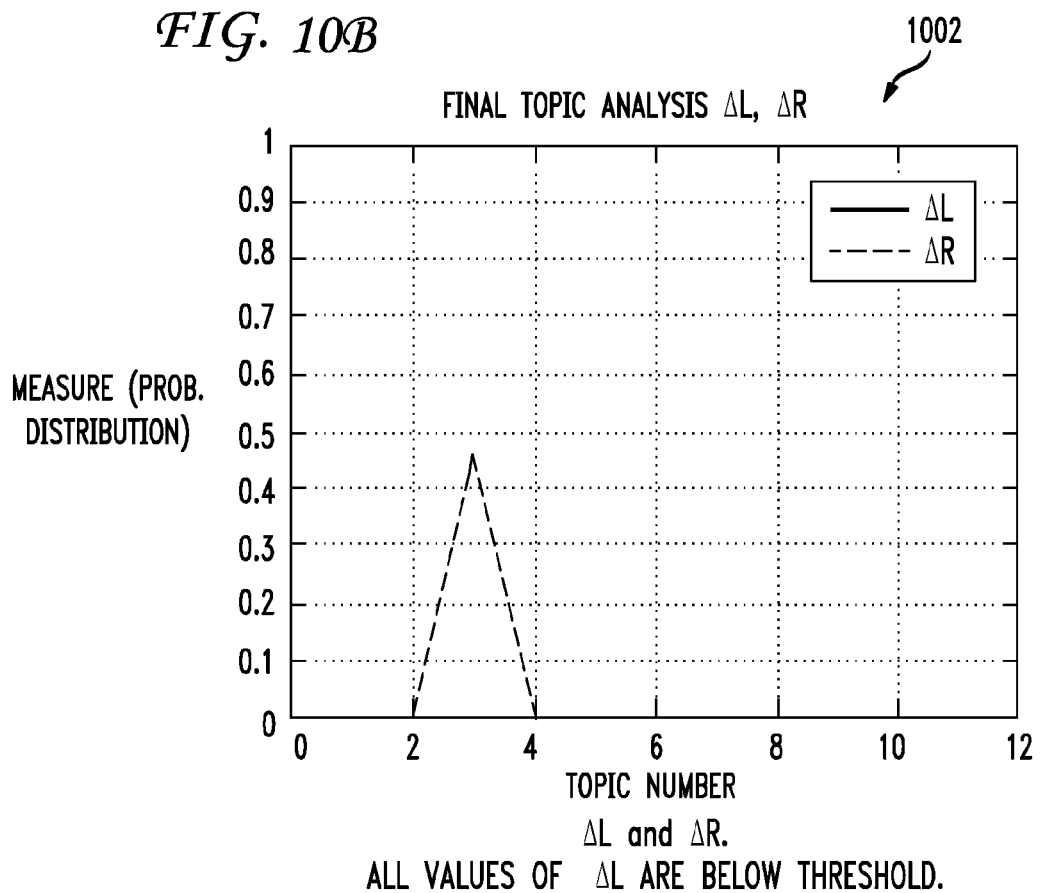

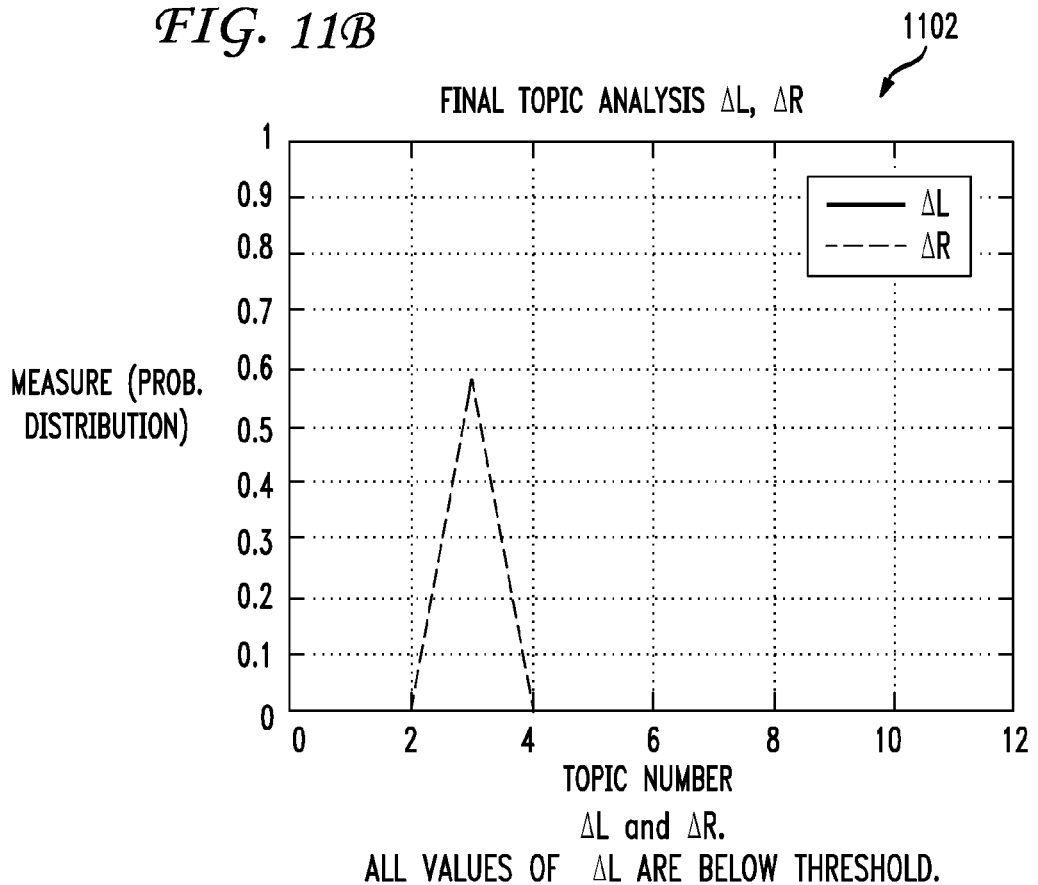

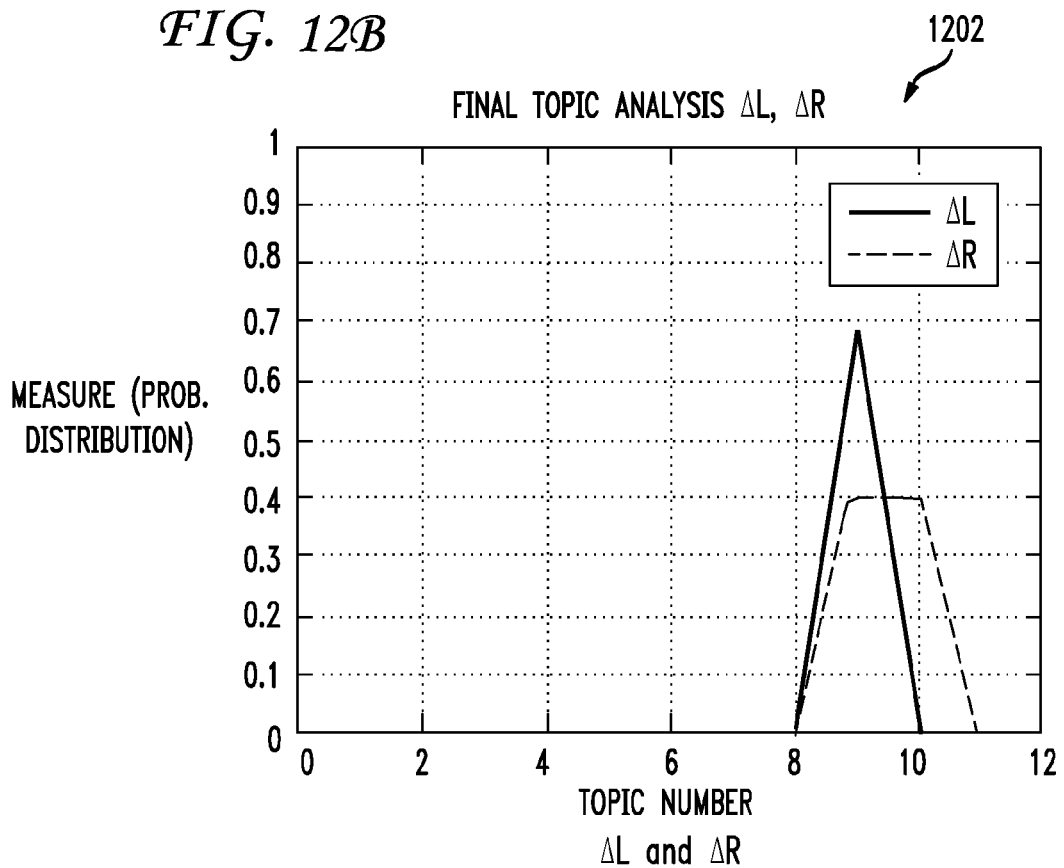

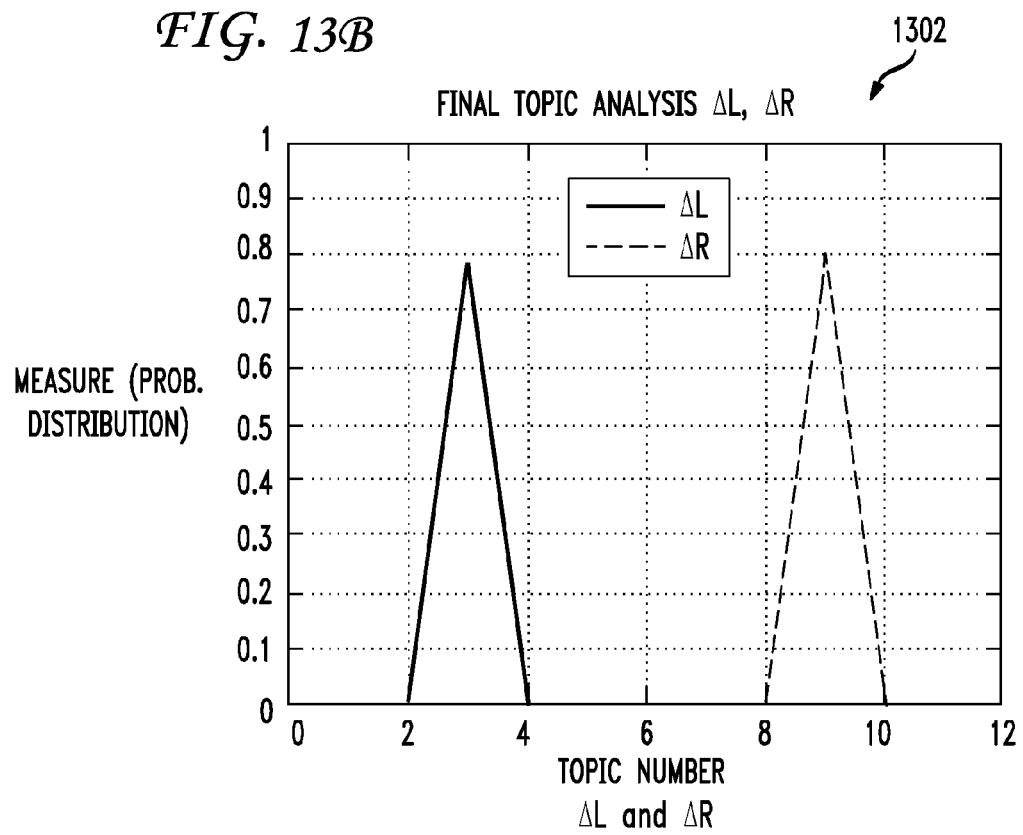

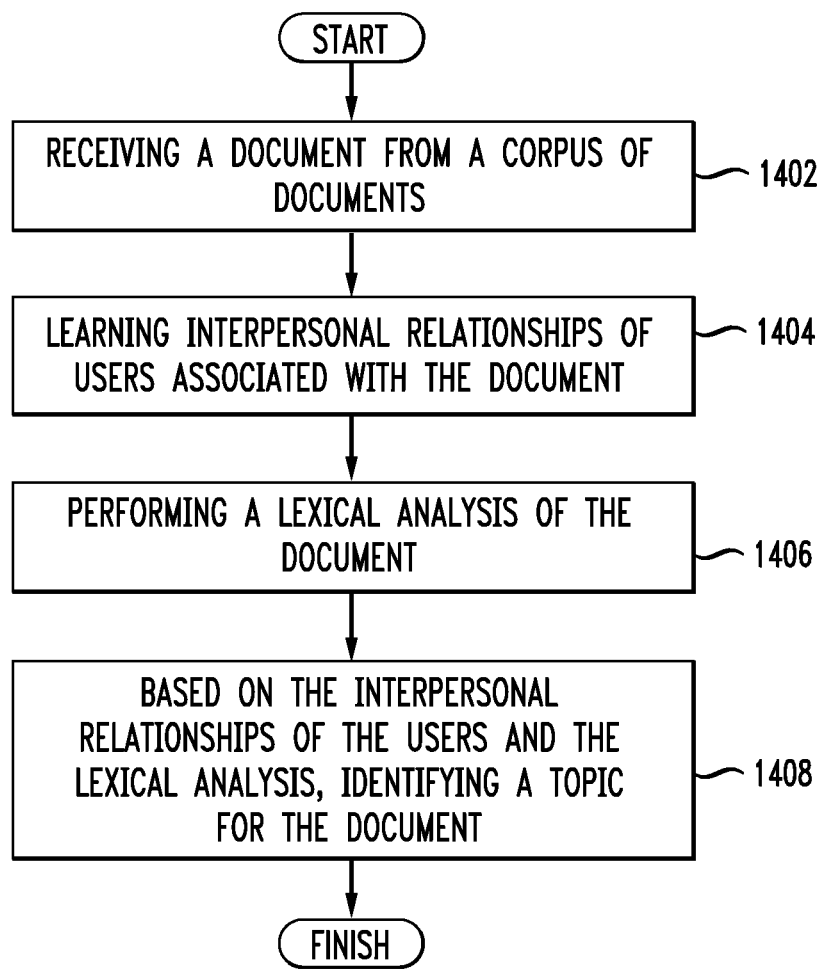

SYSTEM AND METHOD FOR CLASSIFYING COMMUNICATIONS THAT HAVE LOW LEXICAL CONTENT AND/OR HIGH CONTEXTUAL CONTENT INTO GROUPS USING TOPICS

BACKGROUND

1. Technical Field

The present disclosure relates to classifying communications and more specifically to classifying communications that have low lexical content and/or high contextual content based on topic.

2. Introduction

Understanding a user's context in a unified communication (UC) setting is difficult. A UC engine needs to analyze the user's communication data. However, the UC engine needs some concept of similarity to appropriately retrieve this data based on new communication or activity. A context engine can use topic modeling to classify communication data, assuming unsupervised learning of topics from user's data.

Topic modeling has been used for unsupervised learning to classify documents in a corpus, such as a collection of journals. After the modeling, documents in the corpus are categorized into groups based on their lexical content and can be retrieved later in many ways. For example, after classifying a large collection of journals, a user can search the corpus for documents on "photography", which is different from searching for the literal string "photography" in documents. This search covers documents with a high probability of being in the "photography" category, or having "photography" as a keyword.

However, the major problem remains that categorizing communication data in a UC setting for a context engine is extremely difficult. Unlike the classic usages of topic modeling, communication data has certain characteristics that make categorization more difficult to categorize effectively. For example, communication data often exhibit low lexical content. Unlike journal or news articles, books, and other lengthy documents, communication data such as email often have very low lexical content. An example of such communication data is an email that says "Here is an update" with an attachment. Lexically this communication has low content but in terms of fetching 'relevant' emails, the attachment could be highly relevant.

Further, communication data is heavily context based. An email (as well as other forms of communication data such as instant messages, call data, event information, etc.) can have different lexical content but assumes that the participants understand the context from prior communication(s). An example of such communication is "Here is an alternate approach" and the content can discuss about an alternate approach that has no lexical correlation with earlier communication. However, in terms of 'relevance' this email may belong to the same set of topics that are discussed based on the prior context among the participants.

Some existing approaches to this problem include grouping emails and topic modeling of a corpus. Google Mail groups emails (in their beta version of Priority Inbox) using user actions such as 'reply/forward' etc., and through label/tags that are user specified and threads emails. The goal of this approach is to minimize emails in a user's inbox and group them. The Google Mail approach does not rely on lexical aspects or latent topics in a user's email to group the mails and is limited to threading based on the above criteria.

Xobni provides a UC mash-up for a user that brings all information to user. The goal of Xobni is to provide a single interface for all of a user's emails and other data. Xobni do not group information based on latent content of communication. In terms of their scope, Xobni also try to provide a user with as much information as possible.

Some approaches use topic modeling to analyze social networks and blogs. Their goals are to identify the topics being discussed in blogs and to identify the social network of authors in the social networks. These approaches extend topic modeling by introducing an author and link formation model that shares the same (Dirichlet) parameter for inference.

They model author-recipient-topic (ART) relationship as a Bayesian network that discovers discussion topics in social networks. Again, these works assume rich lexical content, which is absent in many email style communications. Once the lexical content and the authorship are known, they focus on deriving relationships among the contribution of authors/participants to various topics. This does not solve the problem in communication corpus where the lexical content is low and the dependency of prior context is high.

A topic modeling approach for emails focuses on understanding user interactions or roles based on topic modeling. This approach primarily relies on lexical content to infer a latent topic and correlate that with user interactions. Their focus is to understand user activity with no emphasis in inferring correct topics for emails with low lexical content or with high contextual content.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for identifying document topics. A system configured to practice the method receives a document from a corpus of documents, learns interpersonal relationships of users associated with the document, performs a lexical analysis of the document, and, based on the interpersonal relationships of the users and the lexical analysis, identifying a topic for the document.

Context-based communication services analyze user data and offer new and novel services that enhance end user unified communication experience. These services can rely on data analysis and machine learning techniques to predict user behavior. Topic modeling can be an unsupervised learning tool to categorize user communication data for retrieval. However, modeling topics based on user communication data, such as emails, meetings, invites, etc, poses several interesting challenges. One challenge is that user communication, even for a single topic, varies with the current context of the participating users. Other challenges include low lexical content and high contextual data in communication corpus. Hence, relying primarily on lexical analysis could result in inferior topic models. The system can model topics for documents based on user communication.

The system can use Latent Dirichlet Allocation (LDA) for extracting topics. LDA models documents as a mixture of latent topics where each topic consists of a probabilistic distribution over words. Then the system overlays a user-relational model over the lexical topic model generated by LDA, whereas the prior art relies on high lexical content in documents and does not consider contextual content in communication.

The approaches disclosed herein integrate user-people relationships to identify topics for documents with low lexical or high contextual content. The system can learn this user-people relationship from observing prior behavior (context). The system uses this learned behavior to identify communication documents correctly.

Another aspect that is unique to this disclosure is the separation of the two phases. The system overlays the learned model on the lexical topic analysis, allowing the system to capture user-defined topics and user behavior that is learned from other factors such as medium (calls, events, etc) or user preferences.

An 'extreme' example that this disclosure solves is an email that has very little (or no) lexical content, but high contextual content. The system can learn user relations and apply them to documents in a communication corpus that have low lexical content. Given a document in the communication corpus the system can generate three matrices based on lexical topic analysis and user relationships. These three matrices capture the indexing of topics, keywords, and document/user topic relationships.

The system can compute the three matrices in a four step process. $\Delta$ is the topic relationship of a document (email, etc). First, the system uses Latent Dirichlet Allocation (LDA) to generate a lexical document-topic matrix, $\Delta L$, and a topic-keywords matrix, $\tau$. Second, based on the participant list for each of the documents in the corpus and using $\Delta$ and $\tau$, the system computes a people-topic matrix, $\chi$. $\chi$ represents a user-people topic relationship. With each document $\chi$ learns the topic model, thereby helping to identify documents that have low lexical content and to bring them closer to their topic of discussion. Third, for each document, using $\chi$ and $\tau$, the system generates user relational document-topic matrix, $\Delta R$. The system can optionally normalize $\Delta R$. Fourth, the system computes $\Delta$ using $\Delta = \alpha 1 * \Delta L + \alpha 2 * \Delta R$ where $\alpha 1$ and $\alpha 2$ are constants and can be configured based on the medium of communication data. These constants allow configuration of the system to lean towards lexical content or towards user relationships in determining the final topics for documents in a corpus.

The main advantage is to correctly place communication documents that have low lexical content and high contextual content to prior communication in appropriate topics for use by context engine and other applications. Another advantage of this approach is allowing learning based on other medium or user-behavior to influence document-topic computation and providing a way to categorize communication documents that have low lexical content and/or high contextual content based on their latent topics.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIGS. 10A and 10B illustrate sample document topic distribution for an email that has low lexical content;

FIGS. 11A and 11B illustrate sample document topic distribution for a mail between a subset of participants as shown in FIGS. 9A and 9B, but with different lexical content;

FIGS. 12A and 12B illustrate sample document topic distribution for a mail between participants that discuss multiple topics over a period of time;

FIGS. 13A and 13B illustrate sample document topic distribution for a mail between participants that discuss multiple topics over a period of time; and FIG. 14 illustrates an example method embodiment.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Figure 1:
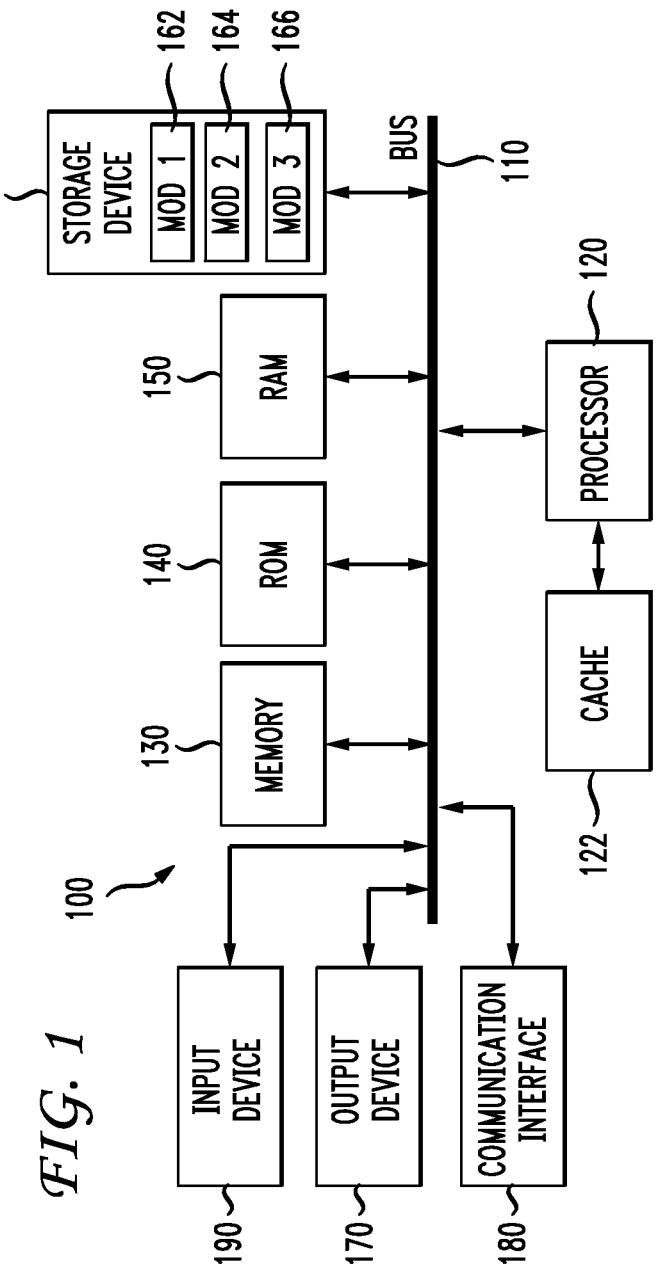
FIG. 1 illustrates an example system embodiment.

The present disclosure addresses the need in the art for categorizing communications (and other) documents having low lexical content and/or high contextual content. A brief introductory description of a basic general purpose system or computing device in FIG. 1 is provided which can be employed to practice the concepts is disclosed herein. A more detailed description of the various implementation details will then follow. These variations shall be discussed herein as the various embodiments are set forth. The disclosure now turns to FIG. 1.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache of high speed memory connected directly with, in close proximity to, or integrated as part of the processor 120. The system 100 copies data from the memory 130 and/or the storage device 160 to the cache for quick access by the processor 120. In this way, the cache provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1 illustrates three modules Mod 1 162, Mod 2 164 and Mod 3 166 which are modules configured to control the processor 120. These modules may be stored on the storage device 160 and loaded into RAM 150 or memory 130 at runtime or may be stored as would be known in the art in other computer-readable memory locations.

Having disclosed some components of a computing system, the disclosure now returns to a discussion of augmenting topic models with user relations in context based communication services. Communication and collaboration applications are increasing their reliance on data analysis and modeling to offer new and rich services to end users. While some services use interfaces provided by online social networks (OSNs) such as Facebook and Twitter, other services use interfaces provided by communication providers, such as Gmail, Yahoo, etc., to mine user data. In enterprise or business networks, the communication data is available in enterprise servers. A primary goal in many of these services is to provide a unified communication experience that integrates voice, email, IM, and other communication medium. They provide services such as click-to-call or click-to-conference services from email or from a document. The approaches disclosed herein look at services that provide a user experience that is more than integrating a set of communication tools. Under this approach, the services can understand user data, their context, and provide services that respond to real-time events in a communication network. For example, on an incoming call, the system can present the called party with documents, conversations (emails, calls, etc), people, and events that are related to the caller. Such services can be called context-based communication services, where context refers to a user's context that is analyzed and predicted from their communication data.

Like OSN and Web 2.0 applications, context-based communication services use several data analysis and machine learning techniques to understand and predict user's context. However, many fundamental differences exist between context-based communication services and OSN services. Data analysis and the predictive models for context-based communication services are based on information available at each user and not on information available through diffusion across a social network. The privacy and security concerns for enterprise communication services are different than that of OSN services. More importantly, in OSNs user relations are explicit and the analysis is to understand roles and information diffusion across social networks. In context-based communication services the analysis is to understand user relations that are implicit and relate user data to the inferred relationships.

This approach uses standard probabilistic analytical models to understand user context. The system mines communication data based on latent topics, capture user activity, and heuristically ranks the topics before exporting them to context based communication services. For example, when a call or an email is received, the system identifies the topic (probability) distribution, and ranks and stores the communication. On an incoming call, a context-based communication service retrieves emails based on prior topic distribution between the caller and called parties. Current topic analysis relies heavily on lexical content and does not fit to the characteristics of communication data. The approaches disclosed herein apply unsupervised learning, such as topic modeling, to communication data.

Some examples are provided to illustrate communications or documents having low lexical content. Unlike text books, journal, and news articles, communication data, such as email data, call data, event information, instant messages, text messages, and other social network based communications can contains low lexical content and high noise. Prior context, or a history of communication between a set of users tend to rely on the previous context of communication and do not explicitly contain any contextual information or contain insufficient contextual information for analysis. In implicit user topic relationships, unlike OSN networks, user relationships are not explicitly defined in communication networks, hence the system can advantageously model user relationships and learn user topic relationships based on the model. Given a context, such as an incoming call or a conference, the system can provide a service that retrieves a user's related conversations, related people, related documents, and related events we need a mechanism that appropriately indexes user's data or perform document retrieval based on latent topics and user relationships.

This disclosure includes a method to augment topic modeling with inferred user relations and apply it to retrieve context from a user's communication data. The system can use a 'related' notion based on topic modeling of communication data in context-based communication applications.

The term "user context" is used to mean several things that relate to a user such as presence information, location information, data obtained from sensors that track user behavior, and information retrieved from user communication data. The user context can be used to understand or predict user behavior using their prior communication data. Unified communication for users is limited to integrating contacts from several sources such as Outlook, Gmail, Facebook, etc., or providing an integrated mailbox for various media or for various service providers. While these unified communication services integrate multiple tools and services, the user must still sort out relevant data for their current activity.

Communication services according to this disclosure can go beyond such an integration, look at the current activity of the user, and present relevant data required for that activity. For example, for any given instance, based on prior history and behavior, a contacts service should predict the people that a user might need. This could be similarly applied to relevant conversations in the past, relevant projects, or relevant events. For example, a user interface with context-based communication services applied to an incoming call can present information to a user mined from previous communications that reflect the current user activity and predict the data that might be useful to the user.

This disclosure focuses on building a notion of 'relevance' by mining and analyzing communication data and on ways this information can be consumed by context-based communication services and other application. The first step in capturing the notion of relevance is to classify communication data into groups of similar items. This can be accomplished by a model of unsupervised learning that can group communication items based on their content and without any user input. This approach has the benefit of finding cross correlations across various communication data elements. A probabilistic topic model for unsupervised learning can discover the correlation in communication data. The system augments the correlation with user communication relationships to appropriately reflect the characteristics of communication data.

Probabilistic topic models can be used to discover latent multi-word summaries of documents using a probabilistic generative model. Each document can be considered as a mixture of topics, where each topic is a probabilistic distribution of words. Standard statistical techniques, such as Gibbs sampling, can invert this process to infer topics from documents. These techniques allow each document to be viewed as a bag of keywords and infer latent topics from a set of such documents. Topic models can generate latent correlations based on co-occurrence of patterns in a document corpus or in social network analysis. Topic modeling can be used to derive latent topics from a communication corpus.

Figure 2:
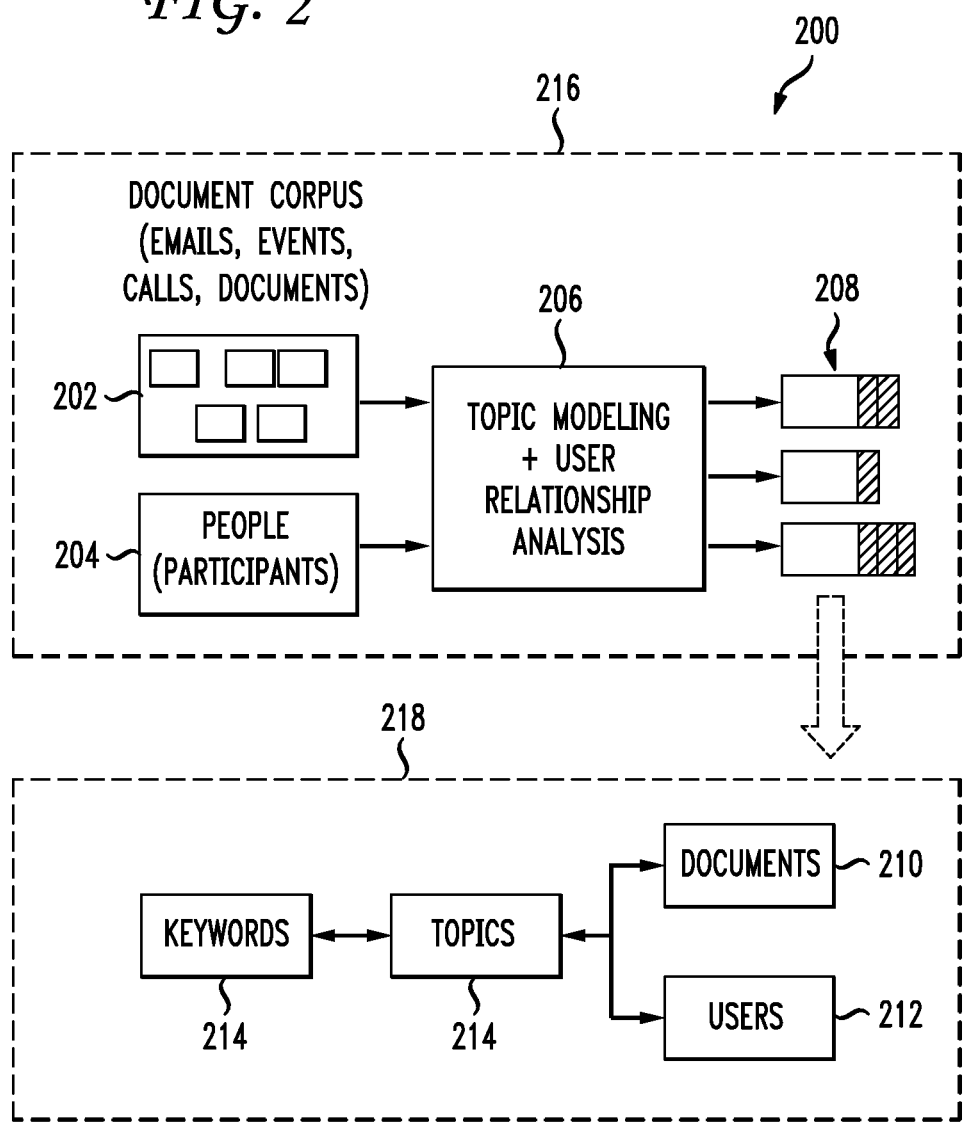
FIG. 2 illustrates an overview of topic modeling in communication services.

FIG. 2 illustrates a high-level overview 200 of topic modeling in communication services. The overview 200 is divided into a first part 216 that shows the application of topic modeling augmented with user relationships and a second part 218 that shows information available to context-based communication services. The overview 200 shows the use of topic modeling 206 along user relationship analysis to generate document-topic relationships and user-topic relationships. The communication or document corpus 202 can include, for example, user emails, events, calls, and documents. The topic modeling+user relationship analysis 206 takes as input the document corpus 202 and a list of people 204 participating in or associated with the document corpus. The examples and tests described herein focus on emails, but the principles are applicable to events, calls, and documents. Communication corpus can include mean email, event, call data, and documents. Unlike a common document repository, a communication corpus is associated with a user and is distinct for each user, such as each user in an enterprise. Hence the analysis discussed herein is done for each enterprise user and distinguishes between a user and people associated with the user. While the term user refers to the user of the communication service and whose communication data is analyzed, the term people is associated with participants in a particular communication medium. For example, the sender and other recipients of an email can be the people associated with the email and the user would be the receiver. User relationships can mean a user's relationship with people whom he or she communicates.

Latent Dirichlet Allocation (LDA) can perform topic modeling 206. LDA considers each document in the corpus 202 as a bag of words and, based on their lexical content, generates a document distribution and a topic distribution 208 based on relationships between keywords 216, topics 214, documents 210, and users 212. The document distribution contains the topic distribution of each document in the corpus. That is for each document d in the corpus, the document distribution is a vector of tuples of the form $\{(t_1, p_1), \ldots, (t_n, p_n)\}$, where $(t_i, p_i)$ gives the probability, $p_i$, that d has topic $t_i$ and n is the number of topics in the entire corpus. The topic distribution defines the number of topics, for each topic associates a set of keywords, and for each keyword associates a weight. Each topic has a few top words with higher weights that in some sense acts as the definition of the topic.

Documents in the communication corpus that have high probability for a topic implies that the lexical content in the documents have a high correlation. To obtain related communication documents given a document d, the system first finds out the topic distribution vector $\vec{t}$ and the corresponding $\vec{t}_p$ topic probabilities of document d. Then the system uses a cosine similarity measure (CSM) to find documents in the communication corpus that are above a threshold and present the results.

While such an approach works well for a corpus that is static and contains rich lexical content, communication corpora are dynamic and rely on prior context in communication. Hence, the applicability of statistical topic modeling to context-based communication services falls short in several aspects. For example, topic modeling works well if the corpus is lexically rich. Communication data, unlike documents, does not always have rich lexical content. Communication corpora, especially emails, have a lot of noise. One of the primary elements of communication corpus, user relationships with people, is not considered in topic modeling. Lexically unrelated elements in the corpus could actually be related. For example, an email with content "I updated the document" is quite generic but refers to a prior context between the sender and recipient(s). Topic modeling will not capture such relationships. This disclosure solves the problem of applying topic modeling to communication corpora to learn latent correlations where the communication corpus could have low lexical content, high noise, and/or have high non-lexical correlations from prior communication.

The disclosure turns to a brief discussion on the relationship between data analysis for OSN applications and context-based communication applications to further highlight the scope of the disclosure. OSN applications and context-based communication applications have some fundamental and subtle distinctions.

Figure 3:
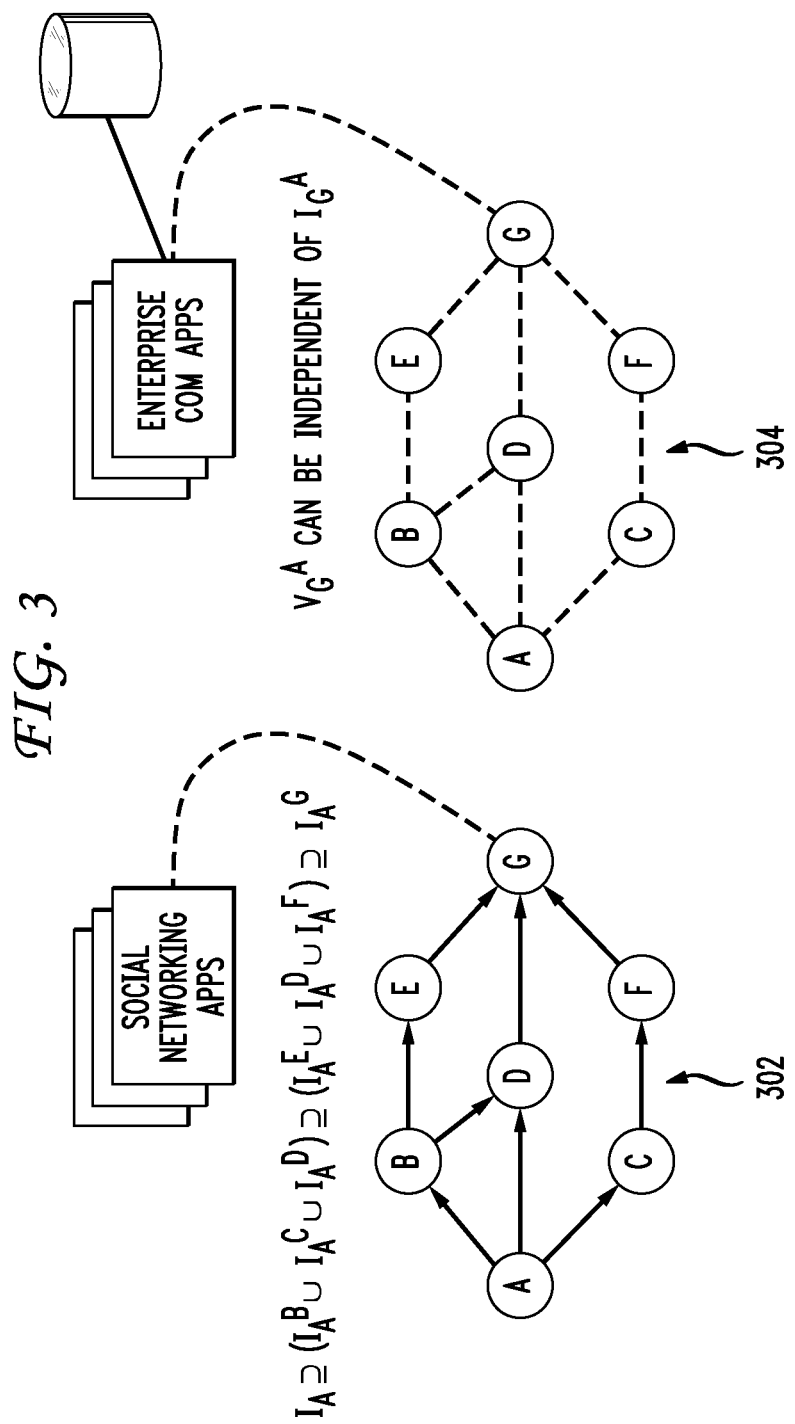
FIG. 3 illustrates information diffusion used in OSN applications and an information view for communication applications.

For example, social networking applications rely on understanding information diffusion and on strong and weak ties across a user's social graph. FIG. 3 illustrates information diffusion used in OSN applications and an information view for communication applications. Social diffusion 302 shows the flow of information in a social network, where information at user G that is reachable from user A is a subset of information published by A, $I_A$. That is the information is propagated from $A \Rightarrow G$. However, for communication applications the relevant information is based on the communication data and is independent of information at A or at other nodes in the graph $I_A$. The view is based on data at each node and unlike social network it is not based on propagation.

While the user communication graph might look the same, for communication applications 304 the connectivity is based on implicit communication links and not on explicit 'friend' relationships. Further, the relevance of a topic and the role of a user for communication applications is based on data available at each node. This can vary from user to user in the graph as each one will have different sets of data, like sent email, calls made, etc. For OSN applications the relevance and role of users is based on a cumulative data available in the social network.

Figure 4:
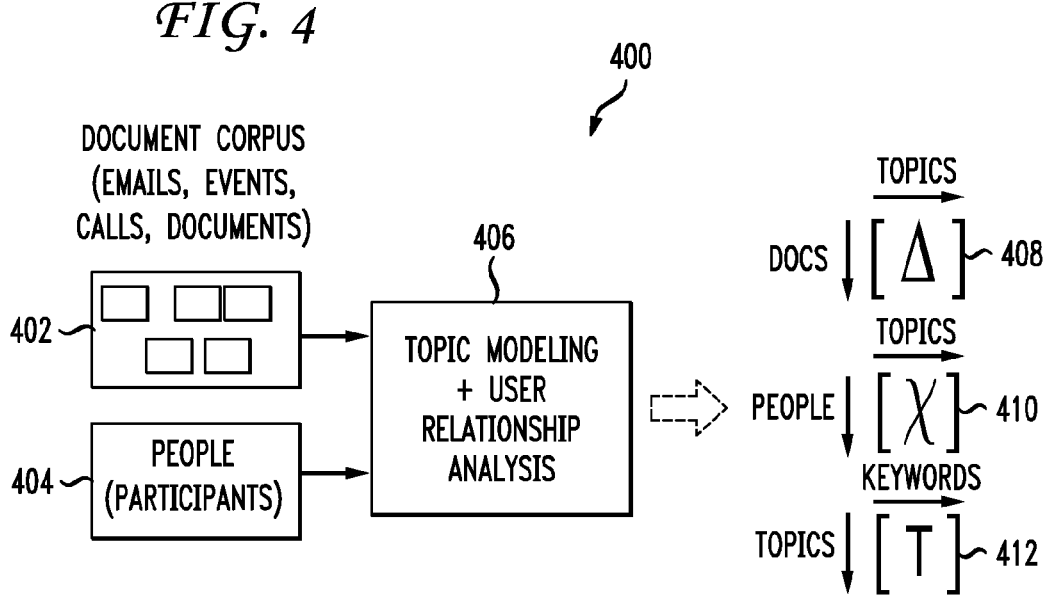
FIG. 4 illustrates an overview of topic modeling with user relations.

The disclosure now turns to a discussion of augmenting topic modeling with user relations. The system augments lexical topic modeling with user relationships for its applicability in context-based communication services. This approach is based on the idea of learning user relations and applying them to documents in communication corpus that have low lexical content. Given a document in the communication corpus, the system generates three matrices based on lexical topic analysis and user relationships. These three matrices capture the indexing of topics, keywords, and document/user topic relationships. FIG. 4 shows an overview 400 that refines FIG. 2 to show the output of this approach. The system can use a three step process to compute the three matrices. The following list describes the computation steps broadly.

The first step is to use LDA to generate lexical document-topic matrix, $\Delta L$, and topic-keywords matrix, $\tau$. The second step is to compute a people-topic matrix $\chi$ based on the participant list for each of the documents in the corpus and using $\Delta L$ and $\tau$. This $\chi$ matrix represents a user-people topic relationship. With each document $\chi$, the system learns the topic model. This helps in identifying documents that have low lexical content and to bring them closer to their topic of discussion. The third step is to use $\chi$ and $\tau$, to generate a user relational document-topic matrix $\Delta R$ for each document. The fourth step is to compute $\Delta$ using the following formula:

$$\Delta = \alpha_1 \Delta L + \alpha_2 \Delta R \qquad \text{Equation 1}$$

where $\alpha_1$ and $\alpha_2$ are constants and can be configured based on the medium of communication data. These constants allow configuration of the system to lean towards lexical content or towards user relationships in determining the final topics for documents in a corpus.

TABLE 1

| | Notation |
|---|---|
| $\Delta$ | Final Document-Topic Matrix |
| $\Delta L$ | Document-Topic Matrix based on Lexical Topic modeling |
| $\Delta R$ | Document-Topic Matrix based on User Relationships |
| $\chi$ | User-Topic Matrix |
| $\Gamma(\vec{t}_1, \vec{t}_2)$ | Cosine similarity function for two vectors |
| $\tau$ | Topic-Word matrix based on Lexical Topic Modeling (LDA) |

Table 1 provides the notation used throughout the specification.

Figure 5:
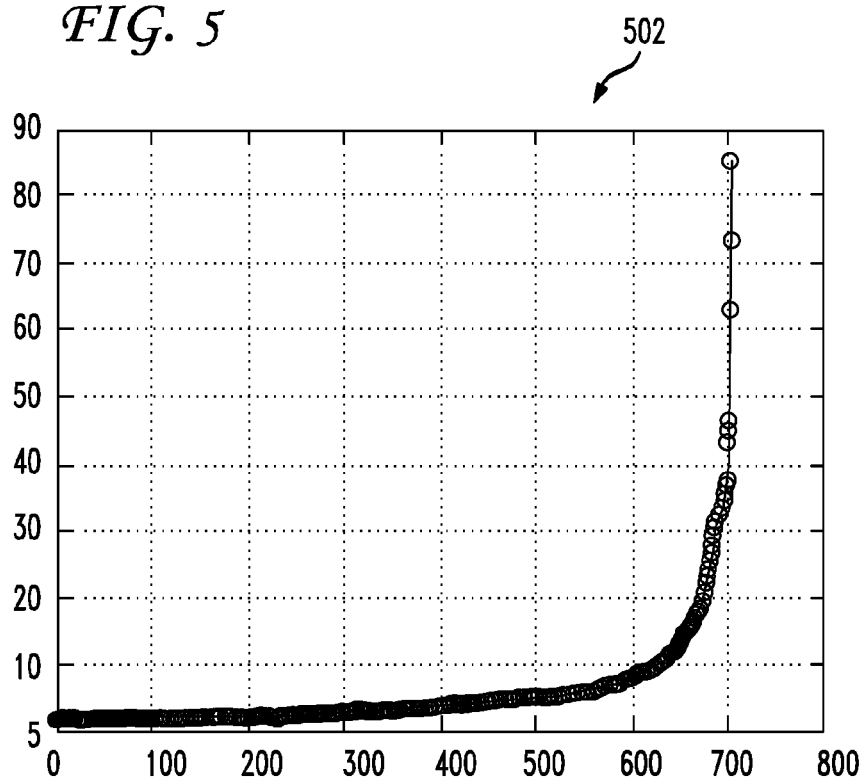
FIG. 5 illustrates sample output from a lexical topic analysis with 11 topics.
Figure 6:
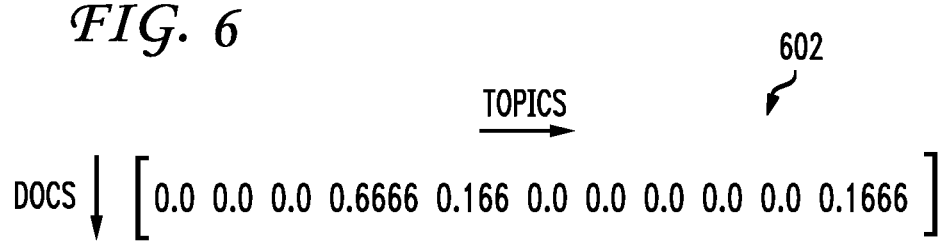
FIG. 6 illustrates an example document topic distribution for the sample output of FIG. 5.

The system can augment topic modeling with user relationships using LDA topic modeling as a black box. Given a set of communication corpus, $D=\{d_1, d_2, \ldots, d_n\}$ and a specific number of topics, and by choosing standard values for hyperparameters ($\alpha$ and $\beta$) required by LDA, the system can obtain a topic-keyword distribution, $\tau$ and a document-topic distribution, $\Delta L$. FIGS. 5 and 6 illustrate a sample entry in $\tau$ matrix and in $\Delta L$ matrix. The topic keyword distribution 502 is shown in FIG. 5 for one topic and the document topic distribution 602 for a document j, $\Delta L_j$ is shown in FIG. 6. The topic keyword distribution shows that typically a topic is heavily weighted towards a few words. These top words can define the topic. The document distribution gives the probability for each topic to which a document may belong. For example, the document j in the figure has a high probability of belonging to topics 4, 5, and 11 and has 0.0 probability of belonging to any other topic. If the lexical content is low or if the document (email) has a high noise content there is a good chance that the document distribution will not have a high probability for any topic.

Even though the system treats lexical analysis of documents using LDA as an atomic operation, the system can encounter two issues. First, the system should determine the training set and the inference set. Typically, LDA, like any machine learning algorithm requires a training set and uses that trained set to infer topics for new data. The system can resolve this issue by simply retraining the communication corpus periodically. This works favorably for communication data because, unlike documents in a repository or journal papers, communication data constantly changes. New incoming communication data can be analyzed based on a relatively recently trained data set.

When using LDA, a second issue that needs to be resolved is the number of topics. LDA requires the number of topics as input and should be specified before training a data set. The number of topics for communication data varies with users and with the content of the corpus. To compute the number of topics, the system can define or use a heuristic function that captures the following two aspects. First, topic words in each topic should be well-defined. Topics should have a few top words with high value of weights, that are clearly separated from a large number of words with low value of weights. FIG. 5 shows an example with less than 15 top words out of more than 700 words. Computationally, the system can calculate the number, N, of such words whose weight is greater than $\mu+2*\sigma$, where $\mu$ is the mean of all words and $\sigma$ is standard deviation of all words. This provides topics that have words that distinctly identify each topic.

Each topic should be clearly separated from other topics. For this, the system can compute the dot product of the word weights for each pair of topics as follows:

$$\Sigma_{t_1,t_2 \in col(\tau)} \gamma(\tau(t_1), \tau(t_2)) \quad \text{Equation 2}$$

A cumulative minimum over all topics provides a topic set that has distinct words with high weights.

This heuristic can computes the above two values and look for a local minimum. These equations may or may not provide an optimal number of topics for a given communication corpus. However the optimal number of topics, though valuable, is not required for the 'related' notion in context-based services. These topics can be used to clearly identify related documents. Hence, a fair estimate based on the above two principles is sufficient for context-based communication services to ensure that topics are clearly defined and well separated.

The disclosure turns to a discussion of computing user-people topic relations $\chi$ and $\Delta R$. One key concept in computing user-people topic relations parallels the characteristics of asynchronous collaborative communication threads, such as emails. For example, new email (and other) discussions start with high lexical content and can gradually use implicit previous context for further correspondence. In user topic relations, the system can track the implicit lexical context along with the user relations. Using this approach, subsequent emails can be reasonably assigned to appropriate topics based on the user relational model that tracks the continuation of the discussion and related topics.

Figure 7:
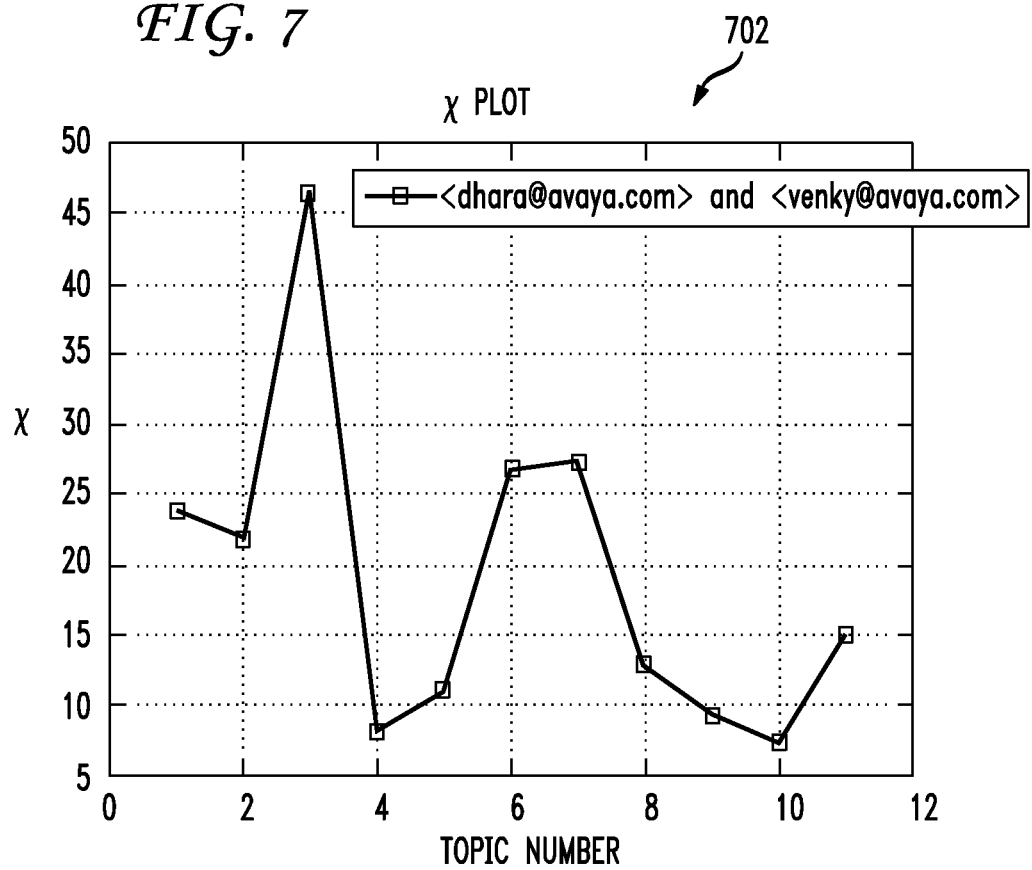
FIG. 7 illustrates sample output for $\chi$ (Dhara, Venky), where Dhara is the user and Venky is a participant in Dhara's conversation.

To compute the user topic relational matrix, $\chi$, the system can use the following steps. For every document d in the communication corpus of a user u, get the users $\vec{r}$ associated with the document. For example, for emails, $\vec{p}$ consists of all the people associated with the mails. For each $p \in \vec{p}$, perform the row operation $$\chi(d,p) = \chi(p) + \mu \times \Delta L(d) \quad \text{Equation 3}$$

where $\mu$ is a constant. The $\chi$ matrix is computed for each user u in the system and represents the topic relation between a user u and all the people who are participants in a communication. As new documents arrive with the same (lexical) topics among the same participants, the system learns and uses the information if the new documents have low lexical content. FIG. 7 shows a sample output 702 from the $\chi$ computation for user Dhara and participant Venky. Note that user Venky, based on his data, will have a different $\chi$, which could resemble FIG. 7 but is computed based on Venky's data with Dhara as participant.

Using $\chi$ matrix the system computes document topic relations as follows. First, the system gets the participant information, $\vec{p}$ of a document d and obtain the sub-matrix of $\chi$ that corresponds to each $p \in \vec{p}$. This sub-matrix, $\Omega$, represents the user topic relation for the participants of the communication document d. As shown in FIG. 7, $\chi$ measures the relevance of a topic with respect to a participant and the values are not normalized. The system normalizes $\Omega$ by computing the probability of a participant relation with respect to a topic as follows. The system takes a column dot product of $\Omega$ to generate the common topic interest for all the people. Let this be row be $d_r$. For each $t \in$ topics, $$\Delta R(d, t) = \frac{d_r(t)}{\sum_{t \in T} d_r(t)} \quad \text{Equation 4}$$

Finally, the system computes $\Delta$, the document topic relation using equation 1.

The disclosure turns now to searching and indexing. With $\Delta$, $\chi$, and $\tau$ computed, the system can achieve the goals outlined above. Various components computed in the previous section can be used in search for related documents and for related people in context-based communication services.

Given a document d from a communication corpus, the system can use the following computation for finding related documents. First, the system locates the topic distribution (with topics and weights) row $\vec{t}$ for document d, $\vec{t} = \Delta(d)$. The row vector $\vec{t}$ represents all topics associated with d. Second, the system computes the cosine similarity measure (dot product) for all the rows of $\Delta$ with respect to $\vec{\tau}$. Third, the system ignores rows with similarity measures that are below a threshold. Fourth, the row IDs of the remaining rows give documents that are similar with respect to topics to the original document d. The system orders these documents by their similarity measure and ranks them.

The system can find documents related to a person, such as upon receiving an incoming call. Given a person (e.g., caller identity), p, the system can find documents that are related by the following steps. First, the system can get the topics associated $\vec{t}$ with person p from $\chi(p)$. Then the system can use steps 2-4 from above.

The system can find documents by keywords as well. Given a set of keywords, $\vec{k} = \{k_1, k_2, \ldots, k_n\}$, from $\tau$ identify the topics $\vec{t}$ that have a high weight value for each $k \in \vec{k}$. Then the system can follow steps 2-4 described earlier to find relevant documents. These are some examples of how the system can use results from topic modeling in context-based communication services.

The disclosure now turns to exemplary implementation details, results, and evaluation. The results illustrate how augmenting lexical topic analysis with user relationships can enhance the document topic relationship. That in turn enhances the related notion required by the context-based communication services.

In the experimental results, the system used the Mallet machine learning kit for the atomic computation of $\Delta L$ and use Java and MatLab for estimating a number of topics and for computing user relational topics $\Delta R$. Because the system is primarily based on inferring latent content in user communication data, the system cannot use simulated data or public communication corpora without the knowledge of their context for evaluation purposes. The system was tested on a deployed network and the results were corroborated with respective users on the topics and relations that are specific to them. The system was tested with existing enterprise servers that interact with real-time communication data.

The testing primarily focused on a communication corpus with characteristics such as low lexical content and high implicit context, especially emails. The subject of each email served as the keyword(s). Because the evaluation is on a real enterprise system with real users, due to the sensitivity of email data in enterprises, this disclosure present results only for one user (co-author of this paper), with user identity Dhara. Though this section discusses emails for Dhara, the system operated with multiple users and thousands of emails. For Dhara over a course of time the system processed over two thousand emails but the results presented in this paper are from 800 emails over one summer. The system ran the training data set for each user for 1000 iterations. A set of common words such as "the", "updated", "RE:", "FW:", etc., are filtered before the analysis.

For user Dhara, the topic heuristic algorithm converged on a local minimum of 11 topics and the top words of topic distribution is shown in the Table 2, below.

TABLE II

Top topic words for user Dhara

| Topics | Top Keywords |
|---|---|
| 1 | discussion context integration follow alpha engine server |
| 2 | archelp session internationalization team menus project |
| 3 | server call sprint context meeting today intern daily stand |
| 4 | web alive room connectedspaces prototyping area shutdown |
| 5 | avaya patent latest touch res uploaded buford week follow |
| 6 | arch review code part meeting weekly development |
| 7 | analysis case topic log interruption communication comm br |
| 8 | rest discuss ws interfaces conference incoming information |
| 9 | apis javascript planned maintenance ui endpoint related system |
| 10 | stories ideas java js jsapp design notification api user july |
| 11 | context engine services iphone integration macos ep accepted |

The top words are obtained from LDA and indicate how email documents for user Dhara are classified into various topics. In the following subsections these topics are used to discuss various documents for user Dhara and the corresponding values of $\Delta L$ and $\Delta R$. In the computation of $\Delta$ (Equation 1), the system takes $\alpha 1=\alpha 2=0.5$, giving equal weight to lexical content in an email and its user relationship. Because $\Delta$ is a mean of $\Delta L$ and $\Delta R$, for clarity, $\Delta$ is not shown in the results.

Figure 8A:
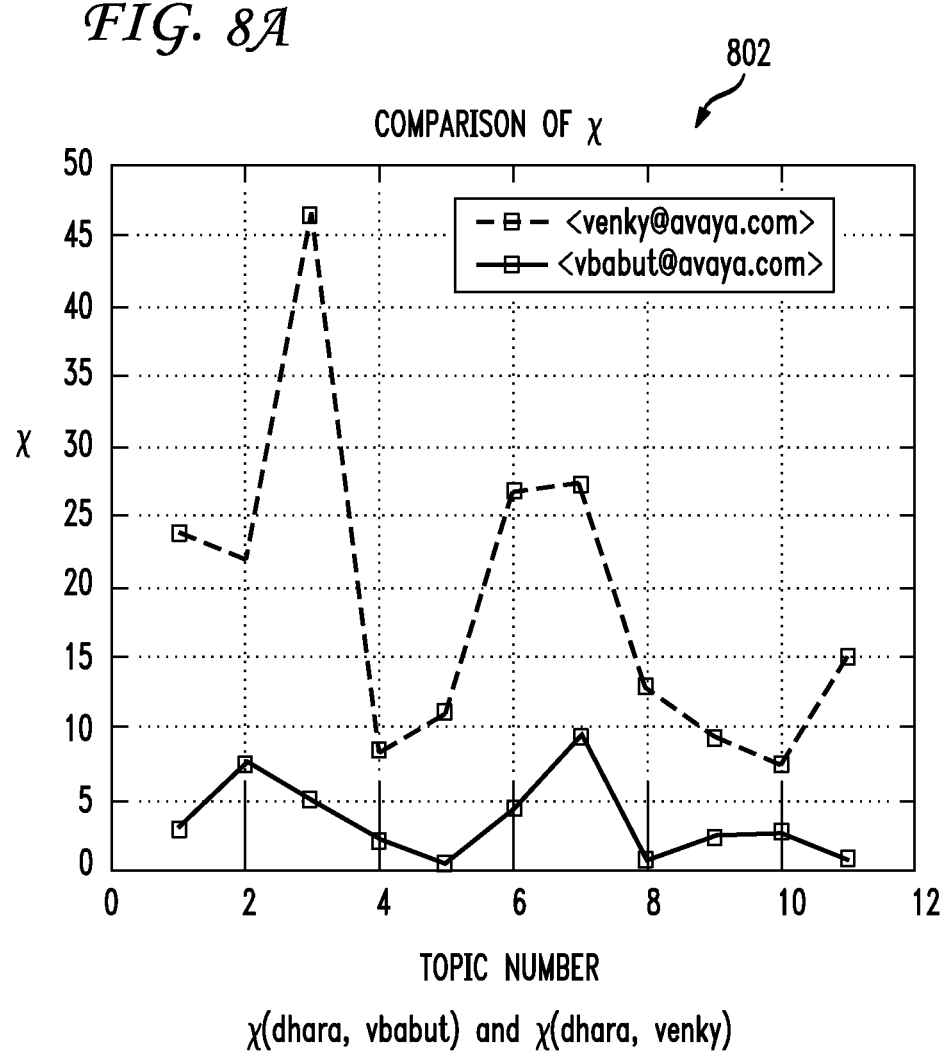
FIGS. 8A and 8B illustrate sample user-people topic relationships for Dhara.
Figure 8B:
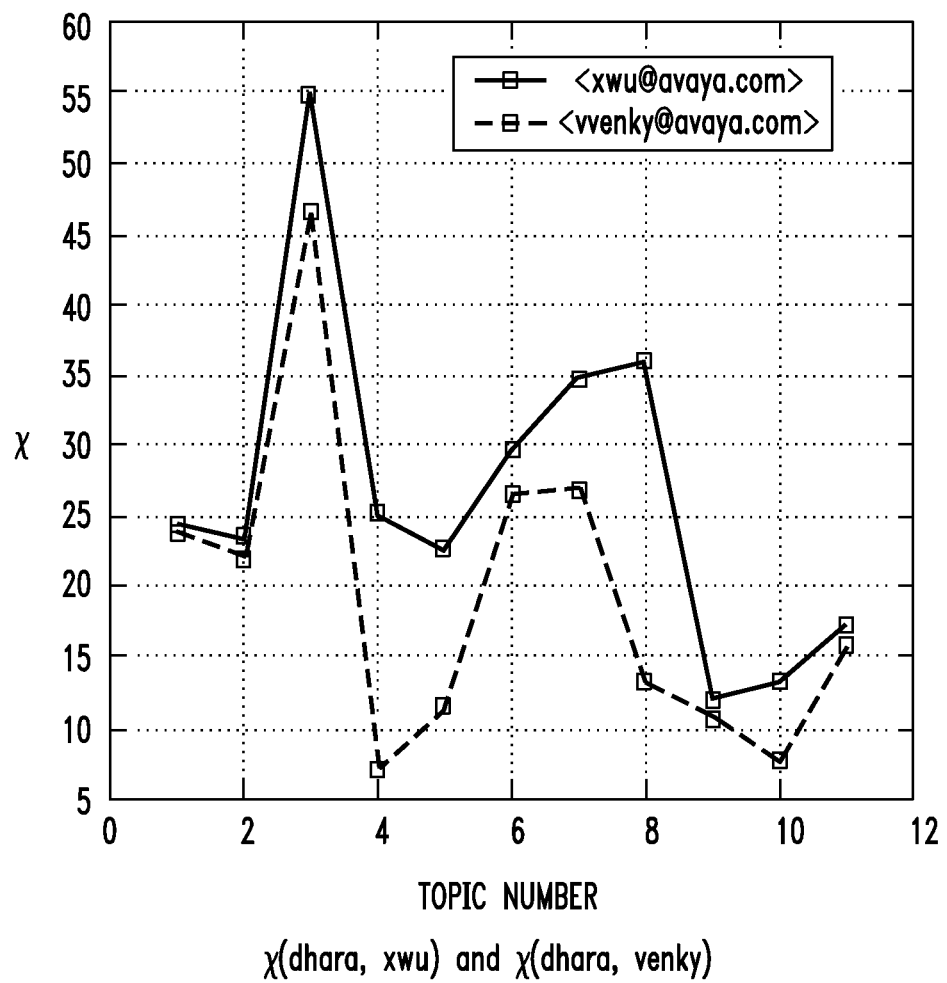

The disclosure turns now to user-people topic relationships, $\chi$. The experimental results first show some user-people relationships for user Dhara based on communication data. This data is in contrast with two sets of people who shared emails with Dhara. FIGS. 8A and 8B, chart 802 shows topic relation between authors. While the topic relationship with Venky is broad, the topic relationship with Vikranth is limited to two or three topics depending on the threshold. In contrast the topic relationship chart 804 in FIG. 8 with a colleague Xiaotao Wu is similar to that of Venky. On an incoming call from Xiaotao Wu the system can display related emails in the Conversations section from the topics associated with Xiaotao Wu obtained from the $\chi$ matrix.

Figures 9A, 9B:
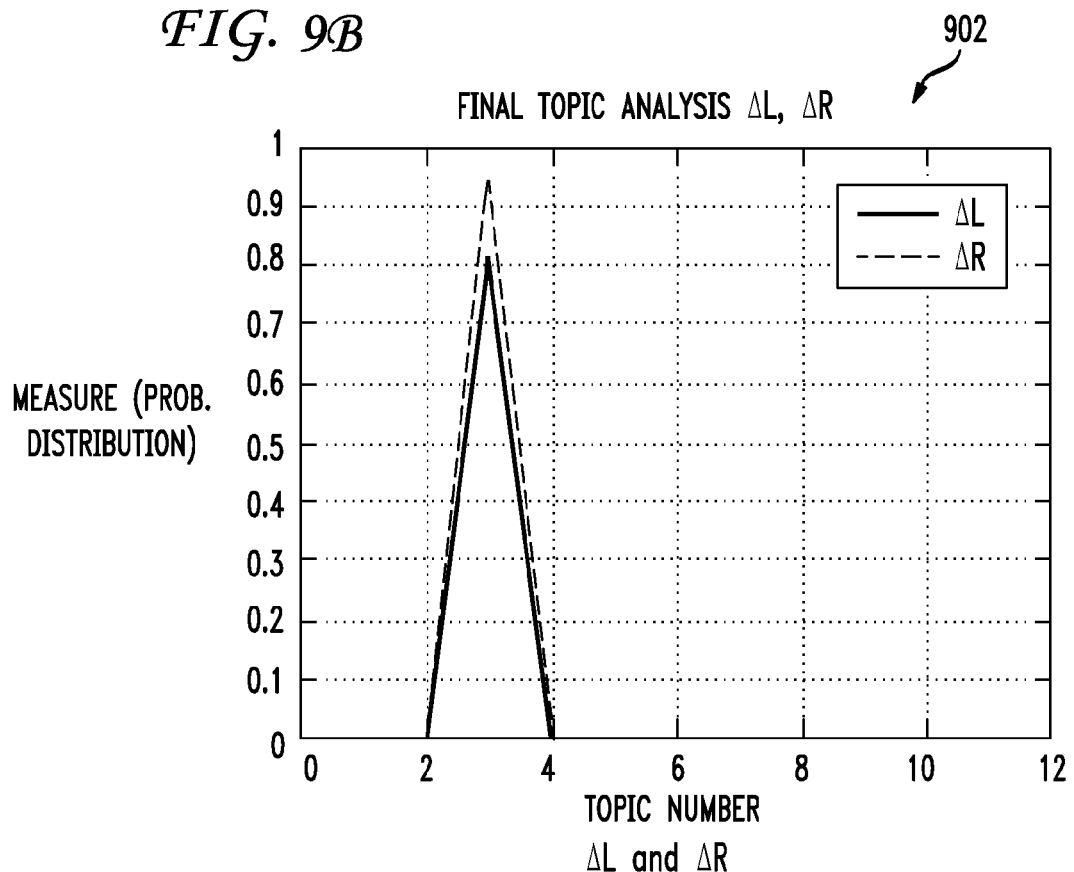
FIGS. 9A and 9B illustrate sample document topic distribution for a weekly group email.

FIGS. 9A and 9B illustrate a chart 902 showing high lexical content and high relational content for a regular email that has a well-defined subject and is received periodically. The subject and the number of participants is shown as well as the lexical and relational graphs converging because the recurrence of this document with high lexical content has a high user relational correlation, $\Delta R$. This correlation is reflected in the chart 902.

FIGS. 10A and 10B illustrates a chart 1002 of sample document topic distribution for an email that has low lexical content. The chart 1002 shows two kinds of email documents that are correlated appropriately by the model even with low lexical content. The first one relates to generic keywords that refer to prior context in communication. FIG. 10 shows an email document that has keywords "FW: how is it going?" From the keywords this document is generic and is very difficult to infer appropriate topics. Hence all values of $\Delta L$ are below the threshold and FIG. 10 does not exhibit any significant topic for $\Delta L$. Clearly, this document is in reference to an earlier context and is typical of a communication paradigm that relies heavily on prior context. The model ensures that this document is placed in the right topic by using $\Delta R$ and identifying the topic to be topic 3. Any search with either topic 3 top words or with other documents belonging to topic 3 or with associated participants can retrieve this document.

An email can have low lexical content if it is new and uses a new set of keywords that do not appear in the trained set. FIGS. 11A and 11B illustrate a chart 1102 of such a document between a subset of users of FIGS. 9A and 9B but with a different lexical content. Based on the topic model, lexical analysis could not place the document in any topic with a value above the threshold. However, based on the user relationships between Dhara and the recipients over a period of time, $\Delta R$ for this document has a high value for topic 4, which corresponds to a discussion on web alive and connected spaces to which this document on collaboration refers.

Communication documents with high lexical content and low relational content indicate that these documents are new and user-people topic relationship will quickly converge to the lexical topic values. If ongoing communication between the participants follows the pattern then both $\Delta L$ and $\Delta R$ converge and if not they will either diverge or the relational content ensures that documents with low content can still be categorized appropriately.

FIGS. 12A and 12B show a chart 1202 describing a document between users that discuss a client interface integration for context-based services based on JavaScript. Hence the relational topics over a period of time are topics 9 and 11. However, this particular document has high lexical content and the final document topic will be correctly biased to topic 9 that contains the discussions on JavaScript API.

Within the context of a project or a team communications can have different lexical content than the learned user relationships. FIGS. 13A and 13B show a chart 1302 that presents such a document with different $\Delta L$ and $\Delta R$ values. In this case, this is the result of starting a new discussion "internationalization" with the design team. Such cases indicate that there is a change in the topics discussed by the user. A large number of such cases indicate the need to retrain the topic model using new communication data.

If documents have low lexical content and low relational content then the system can choose not to classify those documents. This ensures that the system avoids classifying documents incorrectly until the initial topic discussion is known, from which the system can start learning. Though this varies with the type of users in an enterprise, testing has shown that about 5-10 percent of documents belong to this category. Finally, the system can allow user preferred topics via user-specified XML that matches certain communication documents with keywords. This ensures that all such documents are categorized as belonging to the same topics.

Having disclosed some basic system components, concepts, and experimental data, the disclosure now turns to the exemplary method embodiment for identifying document topics shown in FIG. 14. For the sake of clarity, the method is discussed in terms of an exemplary system 100 as shown in FIG. 1 configured to practice the method. The steps outlined herein are exemplary and can be implemented in any combination thereof, including combinations that exclude, add, or modify certain steps. The system 100 receives a document from a corpus of documents (1402). The document can have at least one of low lexical content and high contextual content. The corpus of documents can be a database of a communications history. The documents can include emails, attachments, instant messages, text messages, social network based communications, telephone calls, voicemails, faxes, and other forms of communication that are not typically considered "documents".

The system learns interpersonal relationships of users associated with the document (1404). The system can rely on content and timing of the documents beyond simple threading of emails. The system can also incorporate data from sources external to the documents themselves, including connections on a social network, an organization hierarchy, user locations, and so forth.

The system 100 performs a lexical analysis of the document (1406). The system can generating three matrices based on the lexical analysis and the interpersonal relationships: a lexical document-topic relationship matrix, a topic-keywords matrix, and a user-topic matrix. The lexical document-topic relationship matrix and the topic-keywords matrix can be generated using Latent Dirichlet Allocation (LDA). The user-topic matrix can be generated based on a participant list for each document in the corpus and based on the lexical document-topic relationship matrix and the topic-keywords matrix.

The system 100 identifies a topic for the document based on the interpersonal relationships of the users and the lexical analysis (1408). The topic for the document can be identified based on a balance of lexical content and interpersonal relationships.

This disclosure discussed how context-based communication services are different from OSN applications, leading to a different style of data analysis. The system can use a model that augments standard lexical modeling with user relationships inferred from communication data. The augmented topic modeling places documents with low lexical content and documents with implicit context from prior discussion in appropriate topics with a high probability.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

We claim:

1. A method comprising:
    identifying an interpersonal relationship of a user, the user being associated with a document;
    performing a lexical analysis of the document;
    based on the lexical analysis and the interpersonal relationship, generating a matrix comprising one of a lexical document-topic relationship matrix, a topic-keyword matrix, or a user-topic matrix, wherein one of the lexical document-topic relationship matrix or the topic-keyword matrix is generated using latent Dirichlet allocation; and based on the interpersonal relationship, the lexical analysis, and the matrix, identifying a topic for the document.

2. The method of claim 1, wherein the document has one of low lexical content and high contextual content.

3. The method of claim 1, wherein the user-topic matrix is generated based on a participant list for each document in a corpus of documents and based on the lexical document-topic relationship matrix and the topic-keywords matrix, wherein the corpus of documents comprises the document.

4. The method of claim 1, wherein the topic is identified based on a balance of lexical content of the document and the interpersonal relationship.

5. The method of claim 1, wherein the document is associated with a corpus of documents.

6. A system comprising:
a processor;
a computer-readable storage medium storing instructions which, when executed by the processor, cause the processor to perform operations comprising:
identifying an interpersonal relationship of a user, the user being associated with a document;
performing a lexical analysis of the document;
based on the lexical analysis and the interpersonal relationship, generating a matrix comprising one of a lexical document-topic relationship matrix, a topic-keyword matrix, or a user-topic matrix, wherein one of the lexical document-topic relationship matrix or the topic-keyword matrix is generated using latent Dirichlet allocation; and
classifying the document by topic based on the interpersonal relationship, the lexical analysis, and the matrix.

7. The system of claim 6, wherein the document has one of low lexical content and high contextual content.

8. The system of claim 6, wherein the user-topic matrix is generated based on a participant list for each document in a corpus of documents and based on the lexical document-topic relationship matrix and the topic-keywords matrix, wherein the corpus of documents comprises the document.

9. The system of claim 6, wherein the topic is identified based on a balance of lexical content of the document and the interpersonal relationship.

10. A computer-readable storage device storing instructions which, when executed by a processor, cause the processor to perform operations comprising:
identifying an interpersonal relationship of a user, the user being associated with a document;
performing a lexical analysis of the document;
based on the lexical analysis and the interpersonal relationship, generating a matrix comprising one of a lexical document-topic relationship matrix, a topic-keyword matrix, or a user-topic matrix, wherein one of the lexical document-topic relationship matrix or the topic-keyword matrix is generated using latent Dirichlet allocation; and
based on the interpersonal relationship, the lexical analysis, and the matrix, identifying a topic for the document.

11. The computer-readable storage device of claim 10, wherein the document has one of low lexical content and high contextual content.

12. The computer-readable storage device of claim 10, wherein the user-topic matrix is generated based on a participant list for each document in a corpus of documents and based on the lexical document-topic relationship matrix and the topic-keywords matrix, wherein the corpus of documents comprises the document.

* * * * *